United States Patent
Takahashi et al.

(10) Patent No.: US 10,215,277 B2
(45) Date of Patent: Feb. 26, 2019

(54) CONTROLLER FOR CONTINUOUSLY VARIABLE TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Seiichiro Takahashi, Isehara (JP); Akito Suzuki, Tokyo (JP); Toshiaki Izawa, Atsugi (JP); Takashi Eguchi, Machida (JP); Hidemasa Kawaguchi, Moka (JP)

(73) Assignees: JATCO Ltd, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 199 days.

(21) Appl. No.: 15/501,241

(22) PCT Filed: Jun. 23, 2015

(86) PCT No.: PCT/JP2015/067950
§ 371 (c)(1),
(2) Date: Feb. 2, 2017

(87) PCT Pub. No.: WO2016/021316
PCT Pub. Date: Feb. 11, 2016

(65) Prior Publication Data
US 2017/0227121 A1    Aug. 10, 2017

(30) Foreign Application Priority Data

Aug. 5, 2014  (JP) .................................. 2014-159859

(51) Int. Cl.
*F16H 61/662* (2006.01)
*F16H 9/18* (2006.01)
(Continued)

(52) U.S. Cl.
CPC ......... *F16H 61/6625* (2013.01); *B60W 10/06* (2013.01); *B60W 10/107* (2013.01);
(Continued)

(58) Field of Classification Search
CPC .. F16H 61/6625; F16H 61/66272; F16H 9/18; F16H 2059/147; F16H 2061/0078;
(Continued)

(56) References Cited

U.S. PATENT DOCUMENTS 5,364,321 A * 11/1994 Togai ..................... B60K 31/02
477/42
5,382,205 A *  1/1995 Togai ..................... B60W 10/06
477/43
(Continued)

FOREIGN PATENT DOCUMENTS

JP   H03-181659 A   8/1991
JP   2001-208182 A  8/2001
(Continued)

*Primary Examiner* — Jacob S. Scott
*Assistant Examiner* — Tinh Dang
(74) *Attorney, Agent, or Firm* — Foley & Lardner LLP (57) ABSTRACT

A first target secondary pulley pressure Psteng is calculated based on an output torque Teng of an engine, and then an offset value Psteng+PO is calculated by adding a predetermined offset PO to the first target secondary pulley pressure Psteng. The first target secondary pulley pressure Psteng is outputted as a target secondary pulley pressure Ps(n) when a target secondary pulley pressure Ps(n−1) in a previous control cycle is less than or equal to the first target secondary pulley pressure Psteng; the offset value Psteng+PO is outputted as the target secondary pulley pressure Ps(n) when the target secondary pulley pressure Ps(n−1) in the previous control cycle is greater than or equal to the offset value Psteng+PO; and otherwise, the target secondary pulley pressure Ps(n−1) in the previous control cycle is outputted as the
(Continued)

target secondary pulley pressure Ps(n), thereby suppressing an oscillation in the target secondary pulley pressure Ps(n).

5 Claims, 6 Drawing Sheets

(51) Int. Cl.
| | | |
|---|---|---|
| *B60W 10/06* | (2006.01) | |
| *B60W 10/107* | (2012.01) | |
| *B60W 30/14* | (2006.01) | |
| *F16H 61/00* | (2006.01) | |
| *F16H 59/14* | (2006.01) | |

(52) U.S. Cl.
CPC ............ *B60W 30/143* (2013.01); *F16H 9/18* (2013.01); *F16H 61/66272* (2013.01); *B60W 2510/0657* (2013.01); *B60W 2510/1005* (2013.01); *B60W 2710/0666* (2013.01); *B60W 2710/1005* (2013.01); *F16H 2059/147* (2013.01); *F16H 2061/0078* (2013.01)

(58) Field of Classification Search
CPC ...... F16H 61/04; F16H 61/662; B60W 10/06; B60W 10/107; B60W 30/143; B60W 2510/0657; B60W 2510/1005; B60W 2710/0666; B60W 2710/1005
See application file for complete search history.

(56) References Cited

U.S. PATENT DOCUMENTS

| | | | |
|---|---|---|---|
| 9,212,732 B2* | 12/2015 | Takahashi | F16H 61/66259 |
| 9,989,150 B2* | 6/2018 | Yamanaka | B60K 6/48 |
| 2011/0053718 A1* | 3/2011 | Nonomura | F16H 61/66272 474/70 |

FOREIGN PATENT DOCUMENTS

| | | |
|---|---|---|
| JP | 2004-084749 A | 3/2004 |
| JP | 2012-197819 A | 10/2012 |
| WO | WO-2013/145967 A1 | 10/2013 |

* cited by examiner

ACTUAL TORQUE

CONTROLLER FOR CONTINUOUSLY VARIABLE TRANSMISSION

TECHNICAL FIELD

The present invention relates to a controller for a continuously variable transmission.

BACKGROUND ART

A technology for individually controlling a primary pulley pressure and a secondary pulley pressure, both needed to maintain a given speed change ratio with respect to a given input torque outputted from an engine, has been disclosed in Patent document 1.

However, when engine torque fluctuations occur, the primary pulley pressure and the secondary pulley pressure also fluctuate, and thus an actual speed change ratio (an actual pulley ratio) tends to oscillate in concert with them. Such a state would be likely to cause the driver to feel discomfort.

CITATION LIST

Patent Literature

Patent document 1: Japanese Patent Provisional Publication No. JPH03-181659

SUMMARY OF INVENTION

It is, therefore, in view of the previously-described drawbacks, an object of the invention to provide a controller for a continuously variable transmission, in which a speed change ratio (a transmission ratio) can be stably controlled even when engine torque fluctuations occur.

According to the invention, a first target secondary pulley pressure is calculated based on an engine output torque, and then an offset value is calculated by adding a predetermined offset to the first target secondary pulley pressure. The first target secondary pulley pressure is outputted as a target secondary pulley pressure in a current control cycle when a target secondary pulley pressure in a previous control cycle is less than or equal to the first target secondary pulley pressure, the offset value is outputted as the target secondary pulley pressure in the current control cycle when the target secondary pulley pressure in the previous control cycle is greater than or equal to the offset value, and otherwise, the target secondary pulley pressure in the previous control cycle is outputted as the target secondary pulley pressure in the current control cycle. As set forth above, target secondary pulley pressure stabilization control is carried out.

Accordingly, it is possible to set the target secondary pulley pressure such that an oscillation between the first target secondary pulley pressure and the offset value can be suppressed, and hence it is possible to suppress an oscillation in a secondary pulley pressure (the target secondary pulley pressure). By this, an actual transmission ratio can be stably controlled.

DESCRIPTION OF EMBODIMENTS

Embodiment

Figure 1:
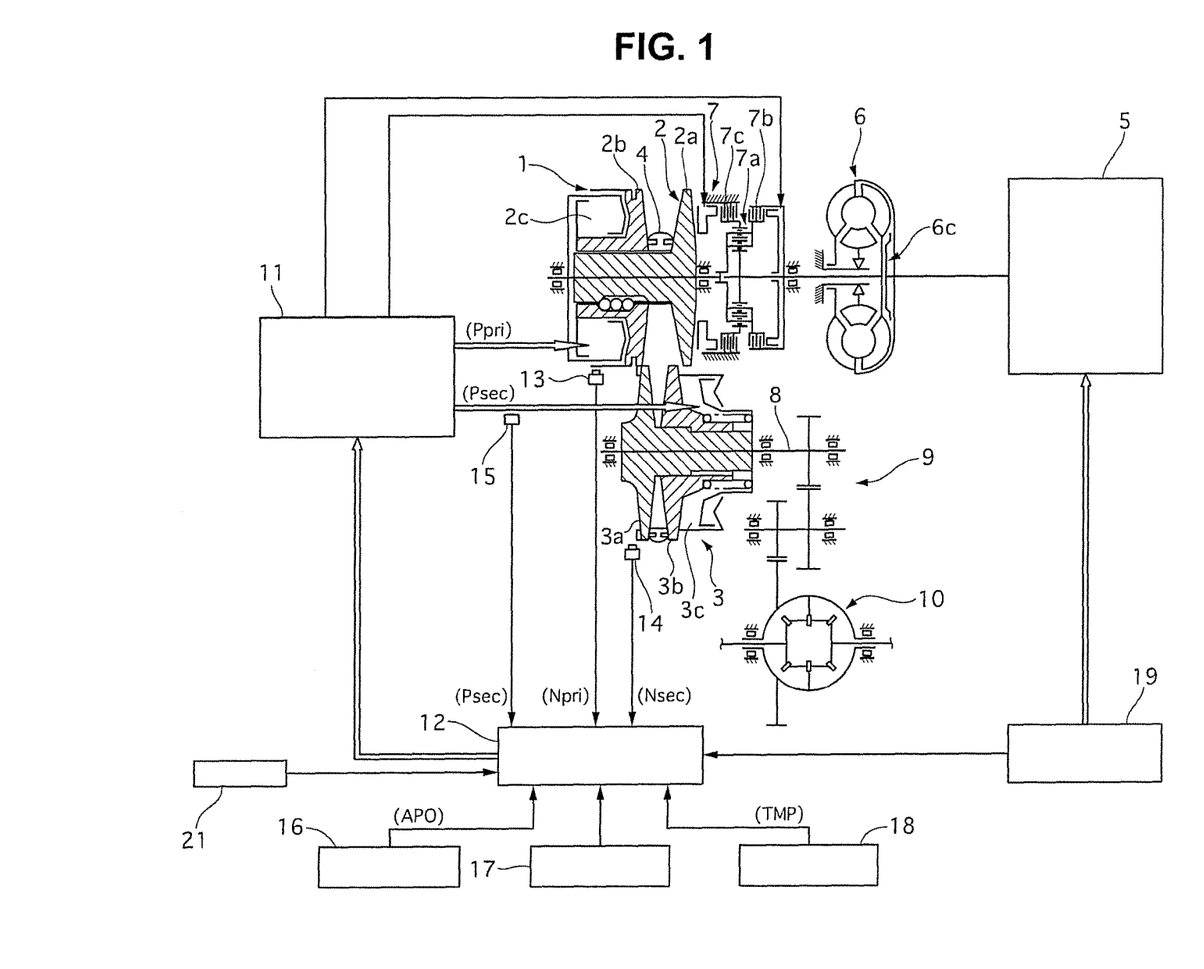
FIG. 1 is a system diagram illustrating a system configuration of a controller for a continuously variable transmission of an embodiment.

Referring to FIG. 1, there is shown the system diagram illustrating the system configuration of a controller for a continuously variable transmission of an embodiment. A belt-type continuously variable transmission 1 (hereinafter referred to as "CVT1") has a primary pulley 2 and a secondary pulley 3, each of which serves as a torque-transmission member. These two pulleys are arranged such that their V grooves are aligned with each other. A belt 4 is wrapped around across the V grooves of these pulleys 2, 3. An engine 5 is arranged coaxially with the primary pulley 2. A torque converter 6 equipped with a lockup clutch 6c, and a forward/reverse (F/R) changeover mechanism 7 are arranged in that order from the side of engine 5 and installed between the engine 5 and the primary pulley 2.

F/R changeover mechanism 7 is mainly comprised of a double-pinion planetary gearset 7a. A sun gear of the planetary gearset is connected through the torque converter 6 to the engine 5, while a carrier of the planetary gearset is connected to the primary pulley 2. F/R changeover mechanism 7 is further equipped with a forward clutch 7b provided for direct-coupling of the sun gear and the carrier of double-pinion planetary gearset 7a, and a reverse brake 7c provided for holding a ring gear of double-pinion planetary gearset 7a stationary. With the forward clutch 7b engaged, input rotation from the engine 5 through the torque converter 6 is directly transmitted to the primary pulley 2. Conversely with the reverse brake 7c applied, input rotation from the engine 5 through the torque converter 6 is reversed and transmitted to the primary pulley 2.

Rotation of the primary pulley 2 is transmitted through the belt 4 to the secondary pulley 3, and then rotation of the secondary pulley 3 is transmitted through an output shaft 8, a gear train 9, and a differential gear device 10 to drive road wheels (not shown). During the above-mentioned power transmission, for the purpose of enabling a transmission ratio (a pulley ratio) between the primary pulley 2 and the secondary pulley 3 to be varied, one of a pair of conical plates constructing the V groove of the primary pulley 2 and one of a pair of conical plates constructing the V groove of the secondary pulley 3 are structured as respective stationary conical plates 2a, 3a. The other conical plate 2b of the primary pulley and the other conical plate 3b of the secondary pulley are structured as respective movable conical plates, which are configured to be axially displaceable. The movable conical plate 2b is biased toward the stationary conical plate 2a by supplying a primary pulley pressure Ppri, produced by regulating a line pressure (serving as a source pressure), into a primary pulley chamber 2c, whereas the movable conical plate 3b is biased toward the stationary conical plate 3a by supplying a secondary pulley pressure Psec, produced by regulating the line pressure, into a secondary pulley chamber 3c. By this, belt 4 is brought into frictional-engagement with the conical plates, thereby enabling power-transmission between the primary pulley 2 and the secondary pulley 3. In order for a shift to occur, the pulley V-groove widths of pulleys 2, 3 are changed by the differential pressure between the primary pulley pressure Ppri and the secondary pulley pressure Psec both produced to be conformable to a target transmission ratio (a target pulley ratio), and thus the circular-arc radii of belt 4 wrapped around across the pulleys 2, 3 are continuously changed so as to realize the target transmission ratio.

Primary pulley pressure Ppri and secondary pulley pressure Psec as well as engagement hydraulic pressure for the forward clutch 7b engaged when a forward-running range is selected and engagement hydraulic pressure for the reverse brake 7c engaged (applied) when a backward-running range (a reverse range) is selected are controlled by means of a shift control hydraulic circuit 11. Shift control hydraulic circuit 11 is configured to perform shift control responsively to a signal from a transmission controller 12. Transmission controller 12 (hereinafter referred to as "CVTCU12") is configured to receive various signals, that is, a signal from a primary pulley rotation sensor 13 for detecting a rotational speed Npri of primary pulley 2, a signal from a secondary pulley rotation sensor 14 for detecting a rotational speed Nsec of secondary pulley 3, a signal from an accelerator operation amount sensor 16 for detecting an accelerator-pedal operation amount APO, a selected range signal from an inhibitor switch 17 for detecting a selector lever position, a signal from an oil temperature sensor 18 for detecting a working oil temperature TMP of CVT1, signals related to an input torque Tp and outputted from an engine controller 19 (hereinafter referred to as "ECU19") for controlling the engine 5 (concretely, an estimated engine torque Teng, an engine speed, a fuel injection time, and the like), and signals from a wheel speed sensor 21 for detecting a wheel speed of each individual road wheel.

Figure 2:
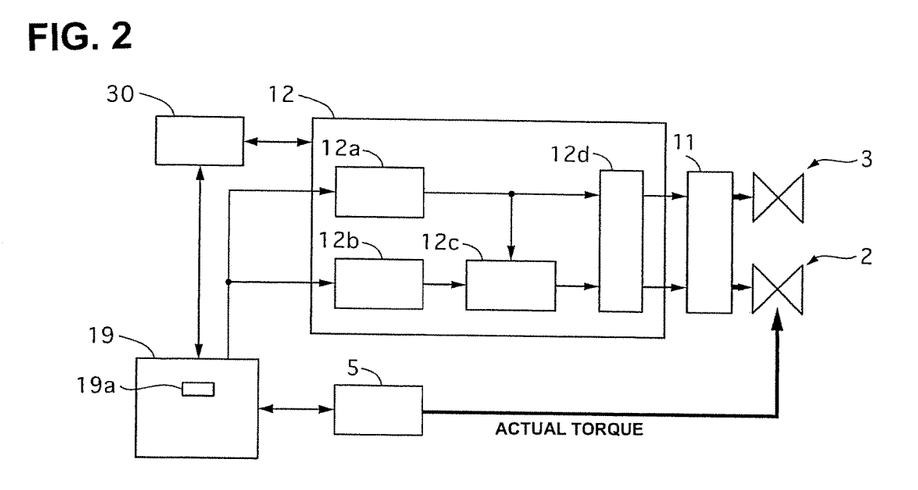
FIG. 2 is a block diagram illustrating transmission ratio control of the embodiment.

Referring to FIG. 2, there is shown the block diagram illustrating transmission ratio control of the embodiment. The CVT1 of the embodiment has a solenoid valve (a control valve), which is able to individually pressure-regulate the primary pulley pressure Ppri and the secondary pulley pressure Psec, when controlling these pulley pressures. These two pulley pressures are pressure-regulated based on a command signal from the CVTCU12, so as to achieve a desired transmission ratio (a desired pulley ratio). The ECU19 has an engine torque estimation section 19a for estimating an engine torque. The engine torque estimation section 19a outputs an estimated engine torque Teng to the CVTCU12. The CVTCU12 has a secondary pulley pressure calculation section 12a for calculating, based on the estimated engine torque Teng, a target secondary pulley pressure Ps(n). Concretely, the secondary pulley pressure calculation section is configured to calculate a first target secondary pulley pressure Psteng corresponding to the estimated engine torque Teng, and outputs a value after having executed secondary pulley pressure stabilization control (described later) as the target secondary pulley pressure Ps(n). By the way, the character "n" of the Ps(n) means or represents a current value of the target secondary pulley pressure in the current control cycle.

Also, the CVTCU12 has a balance thrust ratio calculation section 12b for calculating, based on the estimated engine torque Teng, a ratio of the primary pulley pressure Ppri and the secondary pulley pressure Psec (hereinafter referred to as "balance thrust ratio x1") required to achieve a target transmission ratio. Furthermore, the CVTCU12 has a primary pulley pressure calculation section 12c for calculating, based on the target secondary pulley pressure Ps(n) and the balance thrust ratio x1, a target primary pulley pressure Ppri*. Moreover, the CVTCU12 has a hydraulic pressure command section 12d for outputting a command signal determined based on the target secondary pulley pressure Ps(n) and the target primary pulley pressure Ppri* to a solenoid of shift control hydraulic circuit 11 incorporated within the control valve.

A vehicle of the embodiment also employs a cruise controller 30 that performs auto cruise control (hereinafter referred to as "ASCD control" executed within an Auto Speed Control Device) for automatically maintaining a constant vehicle speed set by the driver, irrespective of the driver's accelerator-pedal operation. When the driver wishes constant vehicle-speed traveling and thus the driver sets a target vehicle speed, the cruise controller 30 outputs a required driving force based on a vehicle speed deviation. To achieve the required driving force, a target engine torque and a target transmission ratio are calculated based on an actual transmission ratio. These calculated values are outputted from the cruise controller to both the ECU19 and the CVTCU12. By this, a desired vehicle speed can be achieved.

(Regarding Transmission Ratio Control During ASCD Control)

Figure 5:
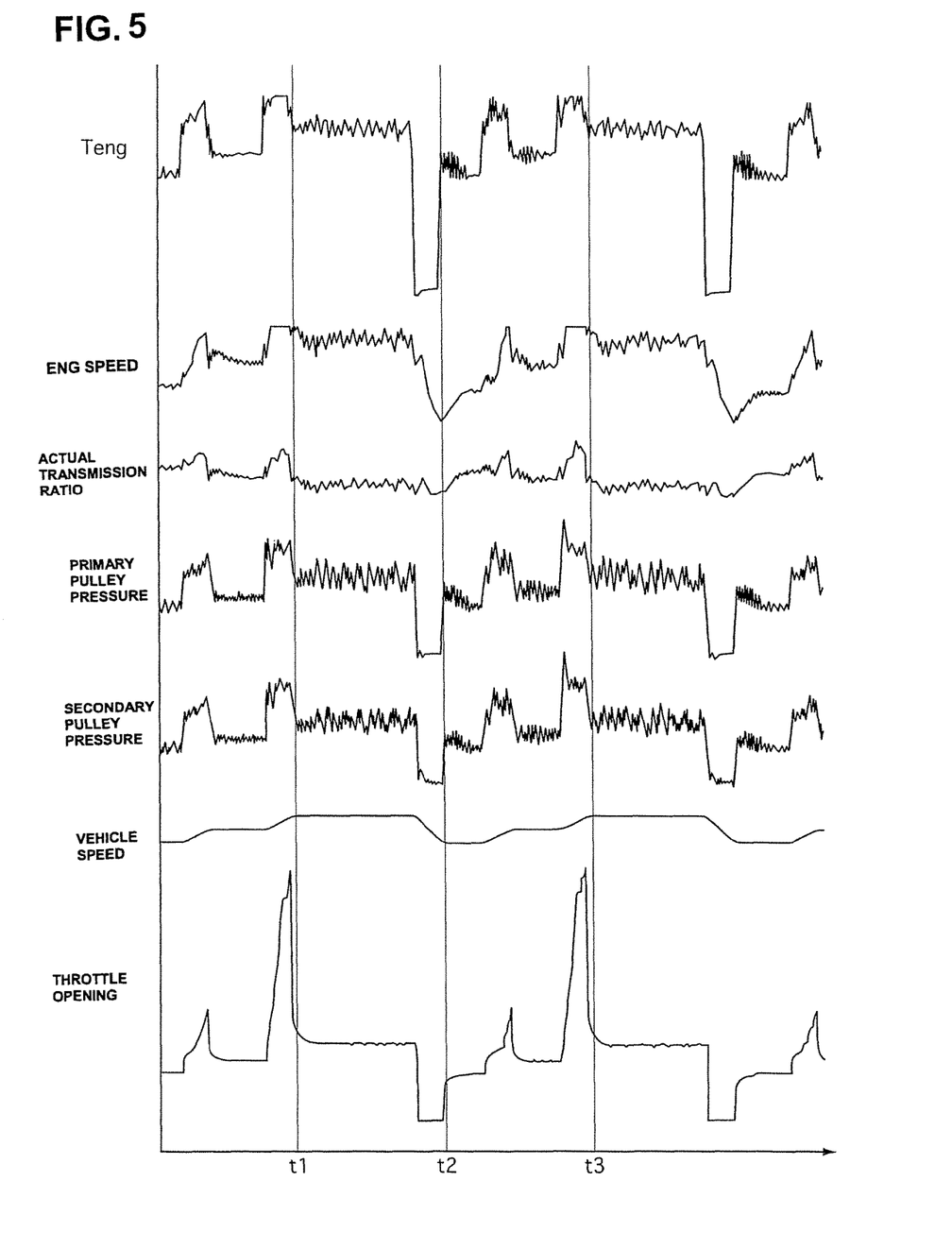
FIG. 5 is a time chart illustrating a change in each of parameters during ASCD control (i.e., during cruise control) in a vehicle of a comparative example.

As discussed above, within the CVTCU12, target secondary pulley pressure Ps(n) and balance thrust ratio x1 are both set based on the estimated engine torque Teng. Furthermore, target primary pulley pressure Ppri* is set based on both the balance thrust ratio x1 and the target secondary pulley pressure Ps(n). Hereupon, when the actual transmission ratio oscillates, engine torque also becomes oscillatory owing to the oscillation in the actual transmission ratio. Referring to FIG. 5, there is shown the time chart illustrating a change in each of parameters during ASCD control in a vehicle of the comparative example. The required driving force (for example, throttle opening), which is outputted for maintaining the vehicle speed at the set vehicle speed during ASCD control, tends to easily fluctuate. For instance, as can be seen from the chart of FIG. 5 at the time t1, the time t2, and the time t3, the throttle opening greatly fluctuates owing to a change in the required driving force. After such a fluctuation has occurred, the primary pulley pressure and the secondary pulley pressure both oscillate. Owing to the oscillation in each of these pulley pressures, the actual transmission ratio tends to oscillate. Additionally, as seen from the chart, the engine torque Teng also becomes oscillatory, because of the feedback-controlled actual transmission ratio. Owing to the oscillation in the engine torque Teng, the actual transmission ratio also becomes oscillatory. The oscillation (the oscillatory actual transmission ratio) is further reflected in the engine torque Teng, and therefore as a whole the control system itself becomes increasingly oscillatory.

For instance, suppose that, for the purpose of suppressing an oscillation in the estimated engine torque Teng, control is carried out based on a moderate torque-value curve obtained by plotting or connecting the crests (the highest points) of consecutive amplitudes of the estimated engine torque Teng or the toughs (the lowest points) of the consecutive amplitudes of the estimated engine torque Teng. By this, the oscillation may be suppressed. However, there is a situation in which a state where the engine 5 outputs a positive torque and a state where the engine outputs a negative torque such as engine braking torque are switched or reversed. Therefore, there is a possibility that the estimated engine torque Teng is calculated as a value less than an actual engine torque. In such a case, there is a possibility that the secondary pulley pressure Psec is outputted as an acceptably low pressure value, and hence a belt slip occurs. This is because the secondary pulley pressure Psec is a pressure such that ensures a clamping force. Alternatively, in calculating the target primary pulley pressure Ppri*, a suppression of the oscillation may be taken into account. However, the target secondary pulley pressure Ps(n), which is calculated based on the estimated engine torque Teng, remains oscillating, and thus it has to be impossible to adequately suppress the oscillation.

For the reasons set out above, in the shown embodiment, during ASCD control, target secondary pulley pressure stabilization processing is executed within the secondary pulley pressure calculation section 12a for the purpose of suppressing the oscillation when outputting the target secondary pulley pressure Ps(n). By this, it is possible to suppress the oscillation in target secondary pulley pressure Ps(n).

Additionally, in calculating the target primary pulley pressure Ppri*, the target secondary pulley pressure Ps(n) is used. At this time, calculation of the target primary pulley pressure Ppri* is made, while making use of the target secondary pulley pressure Ps(n) whose oscillation has been suppressed. Hence, it is possible to stabilize the control system.

Figure 3:
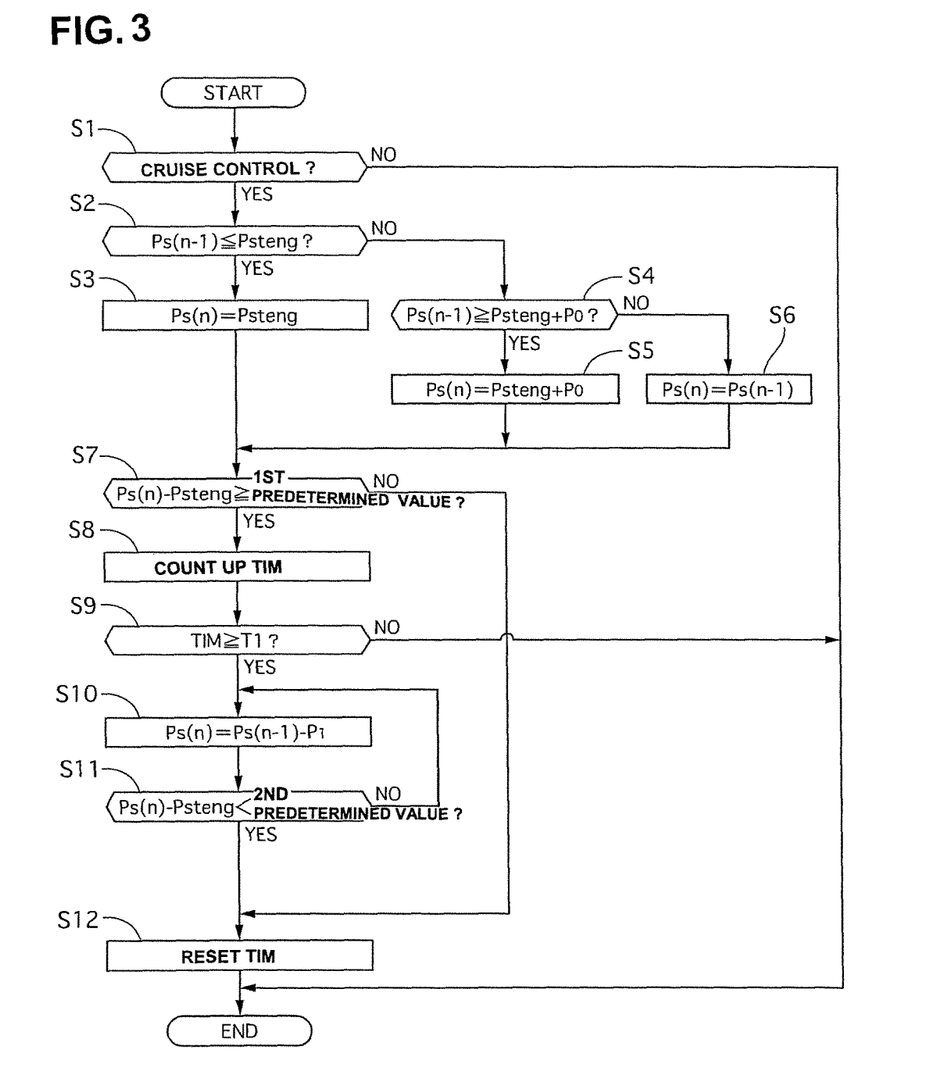
FIG. 3 is a flowchart illustrating secondary pulley pressure control processing of the embodiment.

Referring to FIG. 3, there is shown the flowchart illustrating secondary pulley pressure control processing of the embodiment. The first target secondary pulley pressure is hereinafter denoted by "Psteng", whereas the target secondary pulley pressure is hereinafter denoted by "Ps(n)".

At step S1, a check is made to determine whether the system is in a cruise control mode (an ASCD control mode). When the system is in the ASCD control mode, the routine proceeds to step S2, and otherwise, this control flow terminates. During the ASCD control, an engine torque is controlled based on an actual transmission ratio, and thus it is thought that the control system is in an environment where it is easy to oscillate.

(Stabilization Processing of Target Secondary Pulley Pressure Ps(n))

At step S2, a check is made to determine whether the target secondary pulley pressure Ps(n−1) in a previous control cycle is less than or equal to the first target secondary pulley pressure Psteng in a current control cycle. When the target secondary pulley pressure in the previous control cycle is less than or equal to the first target secondary pulley pressure Psteng, the routine proceeds to step S3, and otherwise, the routine proceeds to step S4.

At step S3, the target secondary pulley pressure Ps(n) in the current control cycle is set as the first target secondary pulley pressure Psteng. In other words, the target secondary pulley pressure Ps(n) in the current control cycle is equal to a value calculated based on the estimated engine torque Teng.

At step S4, a check is made to determine whether the target secondary pulley pressure Ps(n−1) in the previous control cycle is greater than or equal to an offset value (Psteng+PO) calculated by adding a predetermined offset PO to the first target secondary pulley pressure Psteng. When the target secondary pulley pressure in the previous control cycle is greater than or equal to the offset value (Psteng+PO), the routine proceeds to step S5. Conversely when the target secondary pulley pressure in the previous control cycle is less than the offset value (Psteng+PO), the routine proceeds to step S6. By the way, the predetermined offset PO is set at a value greater than or equal to zero (i.e., PO≥0).

At step S5, the target secondary pulley pressure Ps(n) is set at the offset value (Psteng+PO). In other words, the target secondary pulley pressure Ps(n) in the current control cycle decreases along the offset value (Psteng+PO), when the offset value (Psteng+PO) decreases.

At step S6, the target secondary pulley pressure Ps(n) is set at the target secondary pulley pressure Ps(n−1) in the previous control cycle. In other words, the target secondary pulley pressure Ps(n) is maintained or held.

That is, when the routine has proceeded to step S3, the target secondary pulley pressure Ps(n) in the current control cycle rises as compared with the target secondary pulley pressure Ps(n−1) in the previous control cycle. Conversely when the routine has proceeded to step S5, the target secondary pulley pressure Ps(n) in the current control cycle falls as compared with the target secondary pulley pressure Ps(n−1) in the previous control cycle. When the routine has proceeded to step S6, the target secondary pulley pressure Ps(n) in the current control cycle is maintained or held at the target secondary pulley pressure Ps(n−1) in the previous control cycle. Therefore, the target secondary pulley pressure Ps(n) is stabilized.

Concretely, when the input torque rises in comparison with the previous state (the previous input torque value), the target secondary pulley pressure Ps(n) also rises in concert with the input torque rise, thereby preventing a belt slip. In contrast, when the input torque falls in comparison with the previous state and its fall amount is not so large, concretely, the fall amount is less than the predetermined offset PO, the target secondary pulley pressure Ps(n) remains unchanged in comparison with the previous value, that is, the target secondary pulley pressure Ps(n) is maintained or held at the previous value in spite of the input torque fall. Also, when the input torque greatly falls in comparison with the previous state, concretely, the fall amount is greater than or equal to the predetermined offset PO, the target secondary pulley pressure Ps(n) can be reduced in accordance with the input torque fall even though the offset PO is added, and hence it is possible to avoid a state where the target secondary pulley pressure Ps(n) is excessively high as compared to the input torque, thereby preventing a deterioration in the efficiency.

(Reduction Processing of Target Secondary Pulley Pressure Ps(n))

The flowchart of FIG. 3 further includes reduction processing of target secondary pulley pressure Ps(n). At step S7, a check is made to determine whether a difference (Ps(n)−Psteng) between the target secondary pulley pressure Ps(n) and the first target secondary pulley pressure Psteng is greater than or equal to a first predetermined value. When the difference is greater than or equal to the first predetermined value, the routine proceeds to step S8. Conversely when the difference is less than the first predetermined value, the routine proceeds to step S12 at which a timer TIM (described later) is reset. Hereupon, the first predetermined value is less than the predetermined offset PO and, preferably, less than or equal to one-half of the predetermined offset PO. Hence, it is possible to accurately determine whether a value nearer to the offset value is stably maintained. By the way, the first predetermined value is set at a value greater than or equal to zero (i.e., the first predetermined value ≥0).

At step S8, the timer TIM is counted up or incremented.

At step S9, a check is made to determine whether the timer TIM is greater than or equal to a predetermined timer value T1. When the timer TIM is greater than or equal to the predetermined timer value T1, it is determined that a value nearer to the offset value has been stably maintained and then the routine proceeds to step S10. Conversely when the timer TIM is less than the predetermined timer value T1, this control flow terminates. The processing of steps S1 to S6 is repeatedly executed.

At step S10, the target secondary pulley pressure Ps(n) is set at a value calculated by subtracting a predetermined decrement P1 from the target secondary pulley pressure Ps(n−1) in the previous control cycle. Hence, it is possible to gradually reduce the target secondary pulley pressure Ps(n) at a predetermined gradient. Such a reduction of the target secondary pulley pressure Ps(n) means a reduction of a required line pressure. This is advantageous with respect to improved fuel economy.

At step S11, a check is made to determine whether the difference (Ps(n)−Psteng) between the target secondary pulley pressure Ps(n) and the first target secondary pulley pressure Psteng is less than a second predetermined value. When the difference is less than the second predetermined value, the routine proceeds to step S12, and otherwise, the routine returns back to step S10 so as to continuously reduce the target secondary pulley pressure Ps(n). By the way, the second predetermined value is a value less than the first predetermined value. More exactly, the second predetermined value is set at a value such that the target secondary pulley pressure Ps(n) substantially corresponds with the first target secondary pulley pressure Psteng (for example, zero or a value greater than or equal to zero). Hence, it is possible to bring the target secondary pulley pressure Ps(n) closer to a value equivalent to the first target secondary pulley pressure Psteng lower than the offset value (Psteng+PO). Thus, by virtue of a reduction of a required line pressure, it is advantageous with respect to improved fuel economy.

At step S12, the timer TIM is reset. By the way, a situation where the answer to step S7 is in the negative (NO) and thus the routine proceeds to step S12 means that the target secondary pulley pressure Ps(n) and the first target secondary pulley pressure Psteng substantially approximate to each other. A situation where the routine proceeds from step S11 to step S12 means that a reduction of the target secondary pulley pressure Ps(n) from a value nearer to the offset value to a value nearer to the first target secondary pulley pressure Psteng has terminated or completed. As discussed above, the target secondary pulley pressure Ps(n) can be stably reduced until such time that the difference between the target secondary pulley pressure Ps(n) and the first target secondary pulley pressure Psteng reaches a value less than the second predetermined value. In this manner, target secondary pulley pressure reduction processing terminates. By the way, after the timer TIM has been reset, the control flow (the routine) advances again from step S1 to step S6.

(Regarding Stabilization Processing of Target Secondary Pulley Pressure Ps(n))

Figure 4:
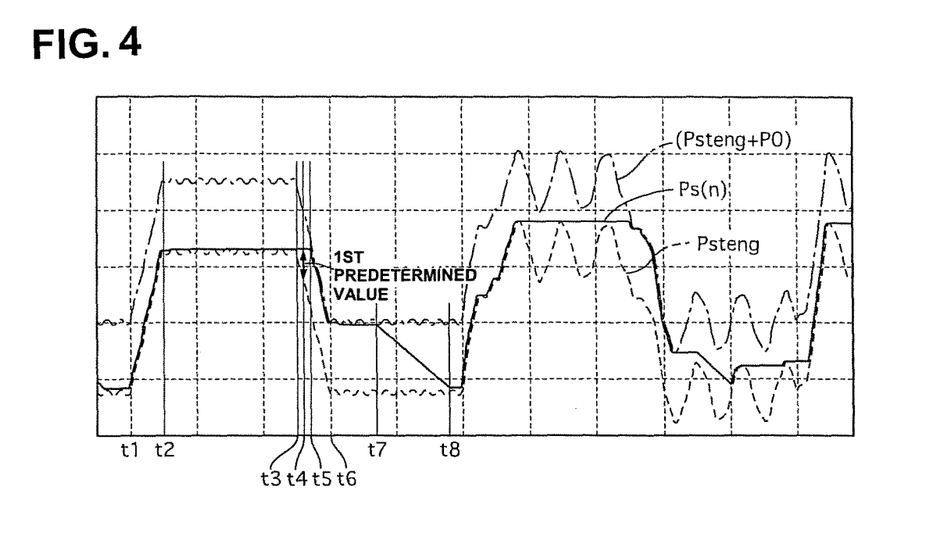
FIG. 4 is a time chart illustrating a state that stabilizes a target secondary pulley pressure by secondary pulley pressure stabilization control processing of the embodiment.

Referring to FIG. 4, there is shown the time chart illustrating a state that stabilizes the target secondary pulley pressure by secondary pulley pressure stabilization control processing of the embodiment. In FIG. 4, the broken line indicates the first target secondary pulley pressure Psteng, the one-dotted line indicates the offset value (Psteng+PO), and the solid line indicates the target secondary pulley pressure Ps(n).

At the time t1, when the first target secondary pulley pressure Psteng rises, the target secondary pulley pressure Ps(n) rises along the first target secondary pulley pressure Psteng, since the target secondary pulley pressure Ps(n) is outputted as the first target secondary pulley pressure Psteng.

At the time t2, when the first target secondary pulley pressure Psteng falls as compared with the target secondary pulley pressure Ps(n−1) in the previous control cycle, the target secondary pulley pressure Ps(n−1) in the previous control cycle is outputted as the target secondary pulley pressure Ps(n). Therefore, even when the first target secondary pulley pressure Psteng oscillates, an oscillation in the target secondary pulley pressure Ps(n) can be suppressed.

At the time t3, the first target secondary pulley pressure Psteng begins to fall, but the target secondary pulley pressure Ps(n) is maintained at the target secondary pulley pressure Ps(n−1) in the previous control cycle. Thereafter, at the time t4, the difference between the target secondary pulley pressure Ps(n) and the first target secondary pulley pressure Psteng becomes greater than or equal to the first predetermined value, and thus the count-up operation of the timer TIM starts. At the time t5, immediately when the difference becomes identical to the offset value (Psteng+PO), the target secondary pulley pressure Ps(n) falls along the offset value (Psteng+PO).

At the time t6, when the offset value (Psteng+PO) rises as compared with the target secondary pulley pressure Ps(n−1) in the previous control cycle, the target secondary pulley pressure Ps(n−1) in the previous control cycle is outputted as the target secondary pulley pressure Ps(n). Therefore, even when the first target secondary pulley pressure Psteng oscillates, an oscillation in the target secondary pulley pressure Ps(n) can be suppressed.

At the time t7, immediately when the timer count value, measured from the time t4, reaches the predetermined time (the predetermined timer value) T1, the target secondary pulley pressure Ps(n) is gradually reduced toward the first target secondary pulley pressure Psteng. By this, fuel economy can be improved.

At the time t8, the difference between the target secondary pulley pressure Ps(n) and the first target secondary pulley pressure Psteng becomes less than the second predetermined value, the target secondary pulley pressure Ps(n−1) in the previous control cycle is outputted as the target secondary pulley pressure Ps(n). After the time t8, the control processing is made in the same manner as discussed previously, and thus the stabilized target secondary pulley pressure Ps(n) can be outputted in contradistinction to an oscillation in the first target secondary pulley pressure Psteng. Additionally, the target secondary pulley pressure Ps(n) can be set at a value nearer to the first target secondary pulley pressure Psteng.

In this manner, in the previously-discussed embodiment, a higher one (a select-high value) of the target secondary pulley pressure Ps(n−1) in the previous control cycle and the first target secondary pulley pressure Psteng is set at the target secondary pulley pressure Ps(n), therefore, an oscillation in the first target secondary pulley pressure Psteng on the side of a pressure fall in particular can be suppressed. Additionally, the offset value (Psteng+PO) is set or calculated, and then a lower one (a select-low value) of the target secondary pulley pressure Ps(n−1) in the previous control cycle and the offset value (Psteng+PO) is set at the target secondary pulley pressure Ps(n), therefore, an oscillation in the first target secondary pulley pressure Psteng on the side of a pressure rise in particular can be suppressed. Accordingly, it is possible to set the target secondary pulley pressure Ps(n) such that an oscillation between the first target secondary pulley pressure Psteng and the offset value (Psteng+PO) can be suppressed, and hence it is possible to suppress an oscillation in the target secondary pulley pressure Ps(n).

Furthermore, when the target secondary pulley pressure Ps(n) changes nearby the offset value (Psteng+PO), the target secondary pulley pressure Ps(n) is reduced closer to the first target secondary pulley pressure Psteng, therefore, a stable and low target secondary pulley pressure Ps(n) can be used, thereby improving fuel economy.

Moreover, the secondary pulley pressure Psec is a pressure value such that ensures a clamping force of CVT1. Accordingly, it is possible to stabilize the target secondary pulley pressure Ps(n) in a pressure area of the first target secondary pulley pressure Psteng or above, thereby suppressing oscillations, while suppressing a belt slip.

Figure 6:
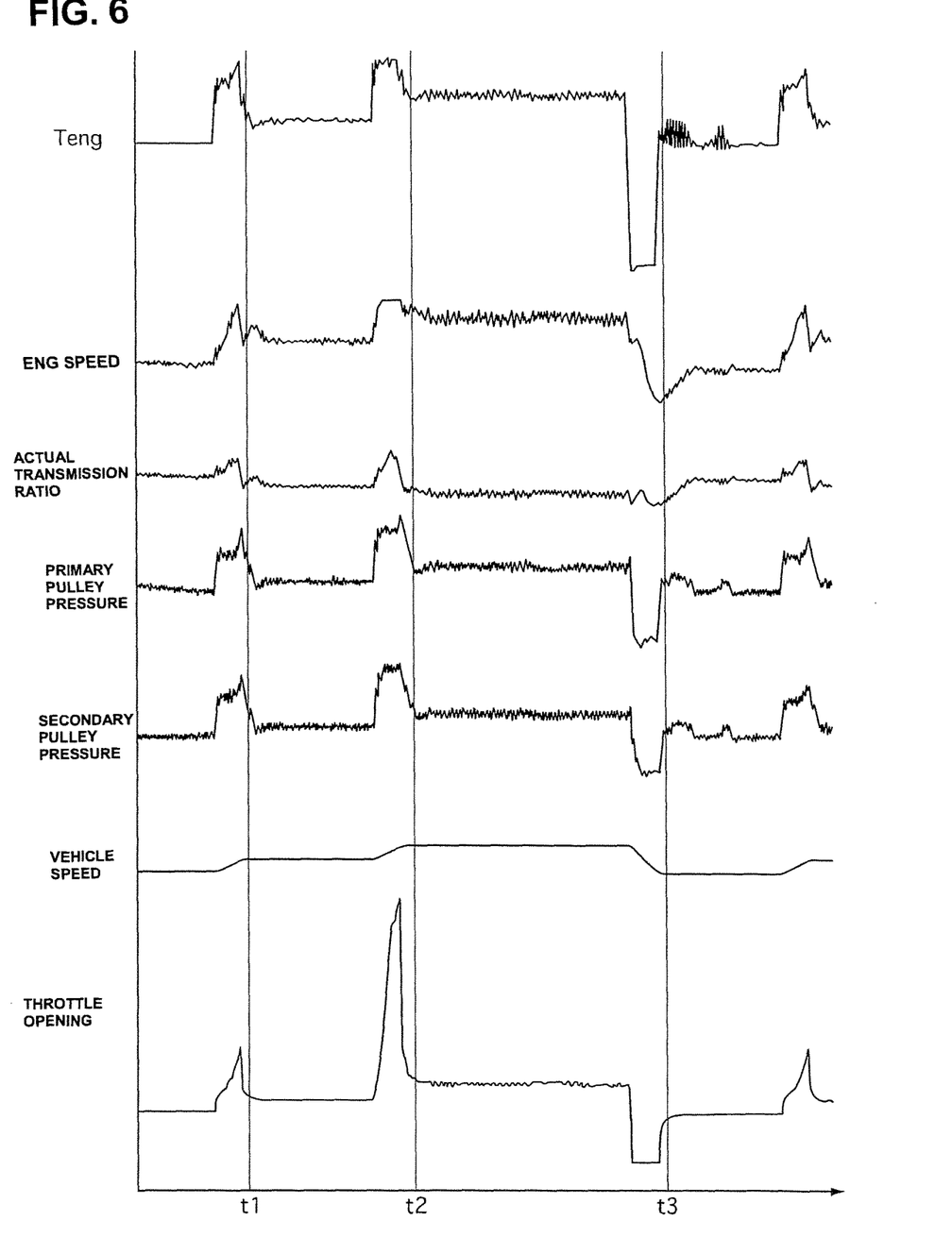
FIG. 6 is a time chart illustrating a change in each of parameters during ASCD control in the embodiment.

Referring to FIG. 6, there is shown the time chart illustrating a change in each of parameters during ASCD control in the shown embodiment. As compared to the time chart of the comparative example of FIG. 5, the time chart of FIG. 6 represents that the amplitude of an oscillation is suppressed to a large degree even immediately after the throttle opening has greatly changed. That is, it will be understood that stable transmission ratio control is realized, and thus fluctuations in the vehicle speed itself are suppressed, thereby avoiding the driver from feeling discomfort.

As explained above, the aforementioned embodiment can provide the operation and effects as enumerated below.

(1) In a controller for a continuously variable transmission having a primary pulley 2 to which an output torque from an engine 5 is inputted, a secondary pulley 3, and a belt 4 wrapped around across both the primary pulley 2 and the secondary pulley 3, the controller being configured to control a pulley pressure of the primary pulley 2 and a pulley pressure of the secondary pulley 3 for achieving a desired transmission ratio, the controller is provided with steps S2 to S6 (i.e., a secondary pulley pressure control means configured to carry out target secondary pulley pressure stabilization control), in which a first target secondary pulley pressure (hereinafter referred to as "Psteng") is calculated based on the output torque (hereinafter referred to as "Teng") from the engine 5, an offset value (Psteng+PO) is calculated by adding a predetermined offset PO to the Psteng, the Psteng is outputted as a target secondary pulley pressure (hereinafter referred to as "Ps(n)") when a target secondary pulley pressure (hereinafter referred to as "Ps(n−1)") in a previous control cycle is less than or equal to the Psteng, the offset value (Psteng+PO) is outputted as the Ps(n) when the Ps(n−1) is greater than or equal to the offset value (Psteng+PO), and otherwise, the Ps(n−1) is outputted as the Ps(n).

Accordingly, it is possible to set the Ps(n) such that an oscillation between the Psteng and the offset value (Psteng+PO) can be suppressed, and hence it is possible to suppress an oscillation in the Ps(n). By this, an actual transmission ratio can be stably controlled.

(2) Also, steps S2 to S11 (within the secondary pulley pressure control means) are carried out during traveling control in which the output torque of the engine 5 is controlled based on an actual transmission ratio of the continuously variable transmission.

Hence, even in a control system such that the Teng becomes apt to oscillate when the actual transmission oscillates, it is possible to stabilize the control system as a whole by suppressing the oscillation in the actual transmission ratio.

(3) The previously-noted travelling control is an auto-cruise control in which vehicle traveling is controlled in a manner which a set vehicle speed is maintained.

Hence, it is possible to stably maintain the vehicle speed, while suppressing the oscillation in the control system.

(4) Also, steps S7 to S10 (within the secondary pulley pressure control means) are provided to switch from steps S2-S6 (i.e., the target secondary pulley pressure stabilization control) to step S10 (i.e., target secondary pulley pressure reduction control) for reducing the Ps(n) when a difference between the Ps(n) and the Psteng is greater than or equal to a first predetermined value.

Hence, it is possible to reduce the Ps(n), and as a result it is possible to reduce a required line pressure, thereby improving fuel economy.

(5) Also, step S11 (within the secondary pulley pressure control means) is provided to switch from steps S7-S10 (i.e., the target secondary pulley pressure reduction control) to steps S2-S6 (i.e., the target secondary pulley pressure stabilization control) when the difference between the Ps(n) and the Psteng becomes less than a second predetermined value less than the first predetermined value during reduction control for reducing the Ps(n) through the use of steps S7-S10.

Hence, it is possible to set the Ps(n) at a lower value such that an oscillation between the Psteng and the offset value can be suppressed, and thus it is possible to improve fuel economy, while suppressing the oscillation in the Ps(n).

While the foregoing is a description of the controller of the one embodiment carried out the invention, it will be understood that the invention is not limited to the embodiment shown and described herein, but that various changes and modifications may be made without departing from the scope or spirit of this invention. In the shown embodiment, the target secondary pulley pressure stabilization processing is exemplified in a specified situation such as during auto-cruise control in which an engine torque is controlled based on an actual transmission ratio, but the invention may be applied to other control functions (other situations). Concretely, the invention may be applied to other situations in which an engine torque is controlled based on a factor (a parameter) other than an actual transmission ratio, for instance, a situation where supercharging pressure feedback control is performed for feedback-controlling supercharging pressure (boost pressure) based on an engine operating condition, or a situation where vehicle body vibration damping control is performed for suppressing a pitching motion and/or a bounce vibration of the vehicle body, utilizing an engine torque. More concretely, in the case of the vehicle body vibration damping control, it is preferable to oscillatingly control the engine torque itself, and also to transmit the oscillatory engine torque to drive road wheels. In this case, high-precision vibration-damping control torque can be transmitted or applied to the drive road wheels by virtue of the stabilized transmission ratio.

The invention claimed is:

1. A controller for a continuously variable transmission having a primary pulley to which an output torque from an engine is inputted, a secondary pulley, and a belt wrapped around across both the primary pulley and the secondary pulley, the controller being configured to control a pulley pressure of the primary pulley and a pulley pressure of the secondary pulley for achieving a desired transmission ratio, the controller comprising:

a secondary pulley pressure control unit configured to carry out target secondary pulley pressure stabilization control, in which a first target secondary pulley pressure is calculated based on the output torque from the engine, an offset value is calculated by adding a predetermined offset to the first target secondary pulley pressure, the first target secondary pulley pressure is outputted as a target secondary pulley pressure in a current control cycle when a target secondary pulley pressure in a previous control cycle is less than or equal to the first target secondary pulley pressure, the offset value is outputted as the target secondary pulley pressure in the current control cycle when the target secondary pulley pressure in the previous control cycle is greater than or equal to the offset value, and otherwise, the target secondary pulley pressure in the previous control cycle is outputted as the target secondary pulley pressure in the current control cycle.

2. The controller for the continuously variable transmission as recited in claim 1, wherein:

the secondary pulley pressure control unit is configured to carry out the target secondary pulley pressure stabilization control during traveling control in which the output torque of the engine is controlled based on an actual transmission ratio of the continuously variable transmission.

3. The controller for the continuously variable transmission as recited in claim 2, wherein:

the travelling control is an auto-cruise control in which vehicle traveling is controlled in a manner which a set vehicle speed is maintained.

4. The controller for the continuously variable transmission as recited in claim 1, wherein:

the secondary pulley pressure control unit is configured to switch from the target secondary pulley pressure stabilization control to target secondary pulley pressure reduction control for reducing the target secondary pulley pressure in the current control cycle when a difference between the target secondary pulley pressure in the current control cycle and the first target secondary pulley pressure is greater than or equal to a first predetermined value.

5. The controller for the continuously variable transmission as recited in claim 4, wherein:

the secondary pulley pressure control unit is configured to switch from the target secondary pulley pressure reduction control to the target secondary pulley pressure stabilization control when the difference between the target secondary pulley pressure in the current control cycle and the first target secondary pulley pressure becomes less than a second predetermined value less than the first predetermined value during the target secondary pulley pressure reduction control.

* * * * *